United States Patent
Lee et al.

(10) Patent No.: US 12,163,018 B2
(45) Date of Patent: Dec. 10, 2024

(54) THERMOPLASTIC RESIN COMPOSITION AND MOLDED PRODUCT MANUFACTURED THEREFROM

(71) Applicant: LOTTE CHEMICAL CORPORATION, Seoul (KR)

(72) Inventors: Eun Joo Lee, Uiwang-si (KR); Young Chul Kwon, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 1072 days.

(21) Appl. No.: 17/052,826

(22) PCT Filed: Jun. 11, 2019

(86) PCT No.: PCT/KR2019/006977
§ 371 (c)(1),
(2) Date: Nov. 4, 2020

(87) PCT Pub. No.: WO2020/004830
PCT Pub. Date: Jan. 2, 2020

(65) Prior Publication Data
US 2021/0238405 A1    Aug. 5, 2021

(30) Foreign Application Priority Data
Jun. 29, 2018  (KR) ........................ 10-2018-0075315

(51) Int. Cl.
| | |
|---|---|
| C08L 51/04 | (2006.01) |
| C08F 220/18 | (2006.01) |
| C08F 220/44 | (2006.01) |
| C08F 236/06 | (2006.01) |
| C08K 3/22 | (2006.01) |
| C08L 25/12 | (2006.01) |
| C08L 51/00 | (2006.01) |

(52) U.S. Cl.
CPC ........ C08L 51/04 (2013.01); C08F 220/1804 (2020.02); C08F 220/44 (2013.01); C08F 236/06 (2013.01); C08K 3/22 (2013.01); C08L 25/12 (2013.01); C08L 51/003 (2013.01); C08K 2003/2296 (2013.01); C08K 2201/005 (2013.01); C08K 2201/006 (2013.01); C08L 2201/02 (2013.01); C08L 2203/30 (2013.01); C08L 2205/03 (2013.01)

(58) Field of Classification Search
CPC .................. C08L 51/04; C08K 3/22
See application file for complete search history.

(56) References Cited

U.S. PATENT DOCUMENTS

| | | | |
|---|---|---|---|
| 5,747,587 A | 5/1998 | Kim et al. | |
| 5,906,679 A * | 5/1999 | Watanabe | C09K 3/16 106/286.6 |
| 2006/0111514 A1 | 5/2006 | Higaki et al. | |
| 2010/0036043 A1 | 2/2010 | Weber et al. | |
| 2018/0086906 A1 | 3/2018 | Eim et al. | |
| 2018/0112056 A1 | 4/2018 | Yang et al. | |
| 2018/0118914 A1 | 5/2018 | Bae et al. | |

FOREIGN PATENT DOCUMENTS

| | | | |
|---|---|---|---|
| CN | 103665614 A | 3/2014 | |
| CN | 107880426 A | 4/2018 | |
| EP | 3315546 A1 * | 5/2018 | ............. C08F 12/02 |
| JP | 10-036620 A | 2/1998 | |
| JP | 11-035787 A | 2/1999 | |
| JP | 11-263705 A | 9/1999 | |
| JP | 2002-146149 A | 5/2002 | |
| JP | 2018-070881 A | 5/2018 | |
| JP | 2018-070884 A | 5/2018 | |
| KR | 10-1998-0009375 A | 4/1998 | |
| KR | 10-0654534 B1 | 12/2006 | |
| KR | 10-2009-0119573 A | 11/2009 | |
| KR | 10-2017-0103726 A | 9/2017 | |
| WO | 2004/046243 A1 | 6/2004 | |
| WO | 2020/004830 A1 | 1/2020 | |

OTHER PUBLICATIONS

International Search Report in counterpart International Application No. PCT/KR2019/006977 dated Sep. 11, 2019, pp. 1-6.
Prasanna, V. L. Etc.. "Insight into the Mechanism of Antibacterial Activity of ZnO: Surface Defects Mediated Reactive Oxygen Species Even in the Dark", Langumir, 2015, Vo. 31., p. 9155-9162.
Office Action in counterpart Chinese Application No. 201980036163.6 dated Nov. 23, 2022, pp. 1-6.

* cited by examiner

*Primary Examiner* — Vickey Nerangis
(74) *Attorney, Agent, or Firm* — Additon, Pendleton & Witherspoon, P.A.

(57) ABSTRACT

The thermoplastic resin composition of the present invention comprises: about 100 parts by weight of a thermoplastic resin containing about 15 to about 35 wt % of a diene-based rubber-modified vinyl-based graft copolymer, about 1 to about 10 wt % of an acrylate-based rubber-modified vinyl-based graft copolymer, and about 64 to about 84 wt % of an aromatic vinyl-based copolymer resin; and about 0.1 to about 5 parts by weight of zinc oxide having an average particle size of about 0.5 to about 3 μm and a BET specific surface area of about 1 to about 10 m²/g. The thermoplastic resin composition has excellent weather resistance, impact resistance, stiffness, flame retardancy, and antibacterial properties.

10 Claims, No Drawings

THERMOPLASTIC RESIN COMPOSITION AND MOLDED PRODUCT MANUFACTURED THEREFROM

CROSS-REFERENCE TO RELATED APPLICATIONS

This application claims priority to and the benefit of International Application No. PCT/KR2019/006977, filed Jun. 11, 2019, which published as WO 2020/004830 on Jan. 2, 2020, and Korean Patent Application No. 10-2018-0075315, filed in the Korean Intellectual Property Office on Jun. 29, 2018, the entire disclosure of each of which is incorporated herein by reference.

TECHNICAL FIELD

The present invention relates to a thermoplastic resin composition and a molded product formed therefrom. More particularly, the present invention relates to a thermoplastic resin composition which has good weather resistance, impact resistance, stiffness, flame retardancy, antibacterial properties, and the like, and a molded product formed therefrom.

BACKGROUND ART

As a thermoplastic resin, a rubber-modified aromatic vinyl copolymer resin such as an acrylonitrile-butadiene-styrene copolymer resin (ABS resin) has good properties in terms of mechanical properties, processability, external appearance, and the like, and is broadly used as interior/exterior materials for electric/electronic products, automobiles, buildings, and the like.

However, since products manufactured using such a rubber-modified aromatic styrene-based copolymer can suffer from yellowing discoloration, cracking, deterioration in mechanical properties, and propagation of bacteria on the surfaces thereof over time, the products are not suitable for use in outdoor environments.

Therefore, there is a need for a thermoplastic resin composition which has good properties in terms of weather resistance, impact resistance, stiffness, flame retardancy, antibacterial properties, and the like.

The background technique of the present invention is disclosed in Korean Patent Laid-open Publication No. 2017-0103726 and the like.

DISCLOSURE

Technical Problem

It is one aspect of the present invention to provide a thermoplastic resin composition which has good properties in terms of weather resistance, impact resistance, stiffness, flame retardancy, antibacterial properties, and the like.

It is another aspect of the present invention to provide a molded product formed of the thermoplastic resin composition.

The above and other aspects of the present invention can be achieved by the present invention described below.

Technical Solution

1. One aspect of the present invention relates to a thermoplastic resin composition. The thermoplastic resin composition includes: about 100 parts by weight of a thermoplastic resin including about 15 wt % to about 35 wt % of a diene-based rubber-modified vinyl graft copolymer, about 1 wt % to about 10 wt % of an acrylate-based rubber-modified vinyl graft copolymer, and about 64 wt % to about 84 wt % of an aromatic vinyl copolymer resin; and about 0.1 parts by weight to about 5 parts by weight of zinc oxide having an average particle diameter of about 0.5 m to about 3 µm and a BET specific surface area of about 1 $m^2$/g to about 10 $m^2$/g.

2. In Embodiment 1, the diene-based rubber-modified vinyl graft copolymer and the acrylate-based rubber-modified vinyl graft copolymer may be present in a weight ratio of about 3:1 to about 10:1.

3. In Embodiment 1 or 2, the diene-based rubber-modified vinyl graft copolymer may be obtained through graft polymerization of a monomer mixture including an aromatic vinyl monomer and a vinyl cyanide monomer to a diene-based rubber polymer.

4. In Embodiments 1 to 3, the acrylate-based rubber-modified vinyl graft copolymer may be obtained through graft polymerization of a monomer mixture including an aromatic vinyl monomer and a vinyl cyanide monomer to an acrylate-based rubber polymer having an average particle diameter of about 200 nm to about 500 nm.

5. In Embodiments 1 to 4, the aromatic vinyl copolymer resin may be a polymer of an aromatic vinyl monomer and a monomer copolymerizable with the aromatic vinyl monomer.

6. In Embodiments 1 to 5, the zinc oxide may have a peak intensity ratio (B/A) of about 0.01 to about 1.0, where A indicates a peak in the wavelength range of 370 nm to 390 nm and B indicates a peak in the wavelength range of 450 nm to 600 nm in photoluminescence measurement.

7. In Embodiments 1 to 6, the zinc oxide may have a peak position degree (2θ) in the range of about 350 to about 37° and a crystallite size of about 1,000 Å to about 2,000 Å in X-ray diffraction (XRD) analysis, as calculated by Equation 1:

$$\text{Crystallite size}(D) = \frac{K\lambda}{\beta\cos\theta} \quad \text{[Equation 1]}$$

where K is a shape factor, λ is an X-ray wavelength, β is an FWHM value (degree) of an X-ray diffraction peak, and θ is a peak position degree.

8. In Embodiments 1 to 7, the thermoplastic resin composition may have a color variation (ΔE) of about 0.5 to about 1.7, as calculated by Equation 2 based on initial color values ($L_0^*$, $a_0^*$, $b_0^*$) measured on an injection-molded specimen having a size of 50 mm×90 mm×3 mm and color values ($L_1^*$, $a_1^*$, $b_1^*$) of the specimen measured after exposure for 1,000 hours in accordance with ASTM G155.

$$\text{Color variation}(\Delta E) = \sqrt{(\Delta L^*)^2 + (\Delta a^*)^2 + (\Delta b^*)^2} \quad \text{[Equation 2]}$$

where ΔL* is a difference ($L_1^*-L_0^*$) between L* values before and after exposure, Δa* is a difference ($a_1^*-a_0^*$) between a* values before and after exposure, and Δb* is a difference ($b_1^*-b_0^*$) between b* values before and after exposure.

9. In Embodiments 1 to 8, the thermoplastic resin composition may have a notched Izod impact strength retention rate of about 70% or more, as calculated according to Equation 3:

Notched Izod impact strength retention rate (%)= ($IZ_1/IZ_0$)×100   [Equation 3]

where $IZ_0$ denotes an initial notched Izod impact strength of a 1/8" thick specimen, as measured in accordance with ASTM D256, and $IZ_1$ denotes a notched Izod impact strength of the specimen, as measured in accordance with ASTM D256 after exposure for 1,000 hours in accordance with ASTM G155.

10. In Embodiments 1 to 9, the thermoplastic resin composition may have a tensile strength retention rate of about 60% or more, as calculated according to Equation 4:

Tensile strength retention rate (%)=$(TS_1/TS_0) \times 100$  [Equation 4]

where $TS_0$ denotes an initial tensile strength of a 3.2 mm thick specimen, as measured at a tensile rate of 5 mm/min in accordance with ASTM D638, and $TS_1$ denotes a tensile strength of the specimen, as measured at a tensile rate of 5 mm/min in accordance with ASTM D638 after exposure for 1,000 hours in accordance with ASTM G155.

11. In Embodiments 1 to 10, the thermoplastic resin composition may have a notched Izod impact strength retention rate of about 50% or more, as calculated according to Equation 5:

Notched Izod impact strength retention rate (%)= $(IZ_2/IZ_0) \times 100$  [Equation 5]

where $IZ_0$ denotes an initial notched Izod impact strength of a 1/8" thick specimen, as measured in accordance with ASTM D256, and $IZ_2$ denotes a notched Izod impact strength of the specimen, as measured in accordance with ASTM D256 after the specimen is dipped in deionized water at 70±1° C. for 7 days and in deionized water at 123±2° C. for 30 minutes.

12. In Embodiments 1 to 11, the thermoplastic resin composition may have a tensile strength retention rate이 about 80% or more, as calculated according to Equation 6:

Tensile strength retention rate (%)=$(TS_2/TS_0) \times 100$  [Equation 6]

where $TS_0$ denotes an initial tensile strength of a 3.2 mm thick specimen, as measured at a tensile rate of 5 mm/min in accordance with ASTM D638, and $TS_1$ denotes a tensile strength of the specimen, as measured in accordance with ASTM D256 after the specimen is dipped in deionized water at 70±1° C. for 7 days and in deionized water at 123±2° C. for 30 minutes.

13. In Embodiments 1 to 12, the thermoplastic resin composition may have a notched Izod impact strength of about 10 kgf·cm/cm to about 30 kgf·cm/cm, as measured on a 1/8" thick specimen in accordance with ASTM D256.

14. In Embodiments 1 to 13, the thermoplastic resin composition may have a tensile strength of about 500 kgf/cm² to about 600 kgf/cm², as measured on a 3.2 mm thick specimen at a tensile rate of 5 mm/min in accordance with ASTM D638.

15. Another aspect of the present invention relates to a molded product. The molded product is formed of the thermoplastic resin composition according to any one of Embodiments 1 to 14.

Advantageous Effects

The present invention provides a thermoplastic resin composition, which has good properties in terms of weather resistance, impact resistance, stiffness, flame retardancy, antibacterial properties, and the like, and a molded product formed of the same.

BEST MODE

Hereinafter, embodiments of the present invention will be described in detail.

A thermoplastic resin composition according to the present invention includes: (A) a thermoplastic resin including (A1) a diene-based rubber-modified vinyl graft copolymer, (A2) an acrylate-based rubber-modified vinyl graft copolymer, and (A3) an aromatic vinyl copolymer resin; and (B) zinc oxide.

As used herein to represent a specific numerical range, the expression "a to b" means "≥a and ≤b".

(A) Thermoplastic Resin

The thermoplastic resin according to the present invention may be a rubber-modified vinyl graft copolymer including (A1) a diene-based rubber-modified vinyl graft copolymer, (A2) an acrylate-based rubber-modified vinyl graft copolymer, and (A3) an aromatic vinyl copolymer resin.

(A1) Diene-Based Rubber-Modified Vinyl Graft Copolymer

The diene-based rubber-modified vinyl graft copolymer according to one embodiment of the present invention serves to improve mechanical properties ((low temperature) impact resistance, stiffness, and the like) of the thermoplastic resin composition, and may be obtained by graft polymerization of a monomer mixture including an aromatic vinyl monomer and a vinyl cyanide monomer to a diene-based rubber polymer. For example, the diene-based rubber-modified vinyl graft copolymer may be obtained by graft polymerization of the monomer mixture including the aromatic vinyl monomer and the vinyl cyanide monomer to the diene-based rubber polymer, in which the monomer mixture may further include a monomer for imparting processability and heat resistance to the monomer mixture, as needed. Here, polymerization may be performed by any polymerization method known in the art, such as emulsion polymerization, suspension polymerization, and the like. In addition, the diene-based rubber-modified vinyl graft copolymer may have a core (rubber polymer)-shell (copolymer of the monomer mixture) structure.

In some embodiments, the diene-based rubber polymer may include, for example, diene rubbers, such as polybutadiene, poly(styrene-butadiene), and poly(acrylonitrile-butadiene), which are used in a typical diene-based rubber-modified vinyl graft copolymer. These may be used alone or as a mixture thereof.

In some embodiments, the diene-based rubber polymer (rubber particle) may have an average (Z-average) particle diameter of about 0.05 μm to about 6 μm, for example, about 0.15 μm to about 4 μm, specifically about 0.25 μm to about 3.5 μm, as measured by a particle size analyzer. Within this range, the thermoplastic resin composition can have good properties in terms of impact resistance, external appearance, and the like. Here, the average (Z-average) particle diameter of the rubber polymer (rubber particles) may be measured by a light scattering method in a latex state. Specifically, a rubber polymer latex is filtered through a mesh to remove coagulum generated during polymerization of the rubber polymer. Then, a mixed solution of 0.5 g of the latex and 30 ml of distilled water is placed in a 1,000 ml flask, which in turn is filled with distilled water to prepare a specimen. Then, 10 ml of the specimen is transferred to a quartz cell, followed by measurement of the average particle diameter of the rubber polymer using a light scattering particle analyzer (Malvern Co., Ltd., Nano-zs).

In some embodiments, the diene-based rubber polymer may be present in an amount of about 20 wt % to about 70 wt %, for example, about 30 wt % to about 60 wt %, based on the total weight (100 wt %) of the diene-based rubber-modified vinyl graft copolymer, and the monomer mixture (including the aromatic vinyl monomer and the vinyl cyanide monomer) may be present in an amount of about 30 wt % to about 80 wt %, for example, about 40 wt % to about 70 wt %, based on 100 wt % of the diene-based rubber-modified vinyl graft copolymer. Within this range, the thermoplastic resin composition can have good properties in terms of external appearance, processability, impact resistance, and the like.

In some embodiments, the aromatic vinyl monomer may be graft copolymerizable with the rubber polymer and may include, for example, styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like. These may be used alone or as a mixture thereof. The aromatic vinyl monomer may be present in an amount of about 10 wt % to about 90 wt %, for example, about 40 wt % to about 90 wt %, based on 100 wt % of the monomer mixture. Within this range, the thermoplastic resin composition can have good processability, impact resistance, and the like.

In some embodiments, the vinyl cyanide monomer is copolymerizable with the aromatic vinyl monomer, and may include, for example, acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may include acrylonitrile, methacrylonitrile, and the like. The vinyl cyanide monomer may be present in an amount of about 10 wt % to about 90 wt %, for example, about 10 wt % to about 60 wt %, based on 100 wt % of the monomer mixture. Within this range, the thermoplastic resin composition can have good chemical resistance, mechanical properties, and the like.

In some embodiments, the monomer for imparting processability and heat resistance may include, for example, (meth)acrylic acid, maleic anhydride, and N-substituted maleimide, without being limited thereto. The monomer for imparting processability and heat resistance may be present in an amount of about 15 wt % or less, for example, about 0.1 wt % to about 10 wt %, based on 100 wt % of the monomer mixture. Within this range, the monomer for imparting processability and heat resistance can impart processability and heat resistance to the thermoplastic resin composition without deterioration in other properties.

In some embodiments, the diene-based rubber-modified vinyl graft copolymer may include, for example, an acrylonitrile-styrene-butadiene graft copolymer (g-ABS copolymer) obtained by grafting styrene and acrylonitrile to a butadiene rubber polymer, and the like.

In some embodiments, the diene-based rubber-modified vinyl graft copolymer (A1) may be present in an amount of about 15 wt % to about 35 wt %, for example, about 17 wt % to about 30 wt %, based on 100 wt % of the thermoplastic resin (A). If the content of the diene-based rubber-modified vinyl graft copolymer is less than about 15 wt %, the thermoplastic resin composition can suffer from deterioration in mechanical properties, molding processability, chemical resistance, and the like, and if the content thereof exceeds about 35 wt %, the thermoplastic resin composition can suffer from deterioration in weather resistance, molding processability, flame retardancy, and the like.

(A2) Acrylate-Based Rubber-Modified Vinyl Graft Copolymer

The acrylate-based rubber-modified vinyl graft copolymer according to one embodiment of the invention serves to improve weather resistance, impact resistance, and the like of the thermoplastic resin composition, and may be obtained by graft polymerization of a monomer mixture including an aromatic vinyl monomer and a vinyl cyanide monomer to an acrylate-based rubber polymer. For example, the acrylate-based rubber-modified vinyl graft copolymer may be obtained by graft polymerization of the monomer mixture including the aromatic vinyl monomer and the vinyl cyanide monomer to the acrylate-based rubber polymer, in which the monomer mixture may further include a monomer for imparting processability and heat resistance to the monomer mixture, as needed. Here, polymerization may be performed by any polymerization method known in the art, such as emulsion polymerization, suspension polymerization, and the like. In addition, the acrylate-based rubber-modified vinyl graft copolymer may have a core (rubber polymer)-shell (copolymer of the monomer mixture) structure.

In some embodiments, the acrylate-based rubber polymer may include, for example, alkyl (meth)acrylate rubbers, and a copolymer of an alkyl (meth)acrylate and an aromatic vinyl compound. These may be used alone or as a mixture thereof. For example, the acrylate-based rubber polymer may include, for example, $C_2$ to $C_{10}$ alkyl acrylate rubbers, a copolymer of a $C_2$ to $C_{10}$ alkyl acrylate and styrene, and combinations thereof, specifically butyl acrylate rubbers, a copolymer of butyl acrylate and styrene, and combinations thereof. Here, the copolymer of the alkyl (meth)acrylate and the aromatic vinyl compound may be prepared through polymerization of about 70 wt % to about 90 wt % of the alkyl (meth)acrylate and about 10 wt % to about 30 wt % of the aromatic vinyl compound, without being limited thereto.

In some embodiments, the acrylate-based rubber polymer (rubber particle) may have an average particle diameter of about 200 nm to about 500 nm, for example, about 250 nm to about 400 nm, as measured by a particle analyzer (Malvern DLS Co., Ltd., Nano zs). Here, the average (z-average) particle diameter of the rubber polymer (rubber particles) may be measured by a light scattering method in a latex state. Specifically, a rubber polymer latex is filtered through a mesh to remove coagulum generated during polymerization of the rubber polymer. Then, a mixed solution of 0.5 g of the latex and 30 ml of distilled water is placed in a 1,000 ml flask, which in turn is filled with distilled water to prepare a specimen. Then, 10 ml of the specimen is transferred to a quartz cell, followed by measurement of the average particle diameter of the rubber polymer using a light scattering particle analyzer (Malvern Co., Ltd., Nano-zs).

In some embodiments, the acrylate-based rubber polymer may be present in an amount of about 20 wt % to about 70 wt %, for example, about 30 wt % to about 60 wt %, based on the total weight (100 wt %) of the acrylate-based rubber-modified vinyl graft copolymer, and the monomer mixture (including the aromatic vinyl monomer and the vinyl cyanide monomer) may be present in an amount of about 30 wt % to about 80 wt %, for example, about 40 wt % to about 70 wt %, based on 100 wt % of the acrylate-based rubber-modified vinyl graft copolymer. Within this range, the thermoplastic resin composition can have good properties in terms of weather resistance, external appearance, impact resistance, and the like.

In some embodiments, the aromatic vinyl monomer may be graft copolymerizable with the rubber polymer and may include, for example, styrene, α-methylstyrene, β-methylstyrene, p-methylstyrene, p-t-butylstyrene, ethylstyrene, vinylxylene, monochlorostyrene, dichlorostyrene, dibromostyrene, vinyl naphthalene, and the like. These may be used alone or as a mixture thereof. The aromatic vinyl monomer may be present in an amount of about 10 wt % to about 90 wt %, for example, about 40 wt % to about 90 wt %, based on 100 wt % of the monomer mixture. Within this range, the thermoplastic resin composition can have good processability, impact resistance, and the like.

In some embodiments, the vinyl cyanide monomer is copolymerizable with the aromatic vinyl monomer, and may include, for example, acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may include acrylonitrile, methacrylonitrile, and the like. The vinyl cyanide monomer may be present in an amount of about 10 wt % to about 90 wt %, for example, about 10 wt % to about 60 wt %, based on 100 wt % of the monomer mixture. Within this range, the thermoplastic resin composition can have good chemical resistance, mechanical properties, and the like.

In some embodiments, the monomer for imparting processability and heat resistance may include, for example, (meth)acrylic acid, maleic anhydride, and N-substituted maleimide, without being limited thereto. The monomer for imparting processability and heat resistance may be present in an amount of about 15 wt % or less, for example, about 0.1 wt % to about 10 wt %, based on 100 wt % of the monomer mixture. Within this range, the monomer for imparting processability and heat resistance can impart processability and heat resistance to the thermoplastic resin composition without deterioration in other properties.

In some embodiments, the acrylate-based rubber-modified vinyl graft copolymer may include, for example, an acrylate-styrene-acrylonitrile graft copolymer (g-ASA copolymer) obtained by grafting styrene and acrylonitrile to an alkyl acrylate rubber polymer, and the like.

In some embodiments, the acrylate-based rubber-modified vinyl graft copolymer (A2) may be present in an amount of about 1 wt % to about 10 wt %, for example, about 3 wt % to about 7 wt %, based on 100 wt % of the thermoplastic resin (A). If the content of the acrylate-based rubber-modified vinyl graft copolymer is less than about 1 wt %, the thermoplastic resin composition can suffer from deterioration in weather resistance, chemical resistance, and the like, and if the content thereof exceeds about 10 wt %, the thermoplastic resin composition can suffer from deterioration in cold impact resistance, coloration, and the like.

In some embodiments, the diene-based rubber-modified vinyl graft copolymer (A1) and the acrylate-based rubber-modified vinyl graft copolymer (A2) may be present in a weight ratio (A1:A2) of about 3:1 to about 10:1, for example, about 3:1 to about 6:1. Within this range, the thermoplastic resin composition can exhibit good properties in terms of weather resistance, mechanical properties, molding processability, and the like.

(A3) Aromatic Vinyl Copolymer Resin

The aromatic vinyl copolymer resin according to one embodiment of the invention may be an aromatic vinyl copolymer resin used for a typical rubber-modified vinyl graft copolymer resin. For example, the aromatic vinyl copolymer resin may be a polymer of a monomer mixture including an aromatic vinyl monomer and a monomer copolymerizable with the aromatic vinyl monomer, such as a vinyl cyanide monomer.

In some embodiments, the aromatic vinyl copolymer resin may be prepared by mixing the aromatic vinyl monomer with the monomer copolymerizable with the aromatic vinyl monomer, followed by polymerization of the mixture. Here, polymerization may be carried out by any well-known polymerization method, such as emulsion polymerization, suspension polymerization, bulk polymerization, and the like.

In some embodiments, the aromatic vinyl monomer may include, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene. These may be used alone or as a mixture thereof. The aromatic vinyl monomer may be present in an amount of about 20 wt % to about 90 wt %, for example, about 30 wt % to about 80 wt %, based on 100 wt % of the aromatic vinyl copolymer resin. Within this range, the thermoplastic resin composition can exhibit good impact resistance, flowability, and the like.

In some embodiments, the monomer copolymerizable with the aromatic vinyl monomer may include a vinyl cyanide monomer, for example, acrylonitrile, methacrylonitrile, ethacrylonitrile, phenylacrylonitrile, α-chloroacrylonitrile, fumaronitrile, and the like. These may be used alone or as a mixture thereof. The monomer copolymerizable with the aromatic vinyl monomer may be present in an amount of about 10 wt % to about 80 wt %, for example, about 20 wt % to about 70 wt %, based on 100 wt % of the aromatic vinyl copolymer resin. Within this range, the thermoplastic resin composition can exhibit good impact resistance, flowability, and the like.

In some embodiments, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin exhibits good mechanical strength, formability, and the like.

In some embodiments, the aromatic vinyl copolymer resin (A3) may be present in an amount of about 64 wt % to about 84 wt %, for example, about 65 wt % to about 80 wt %, based on 100 wt % of the thermoplastic resin (A). Within this range, the thermoplastic resin composition can exhibit good properties in terms of external appearance, flowability (molding processability), mechanical properties, and balance therebetween.

(B) Zinc Oxide

According to the present invention, zinc oxide serves to provide significant improvement in weather resistance, antibacterial properties, impact strength and flame retardancy of the thermoplastic resin composition together with particular amounts of the diene-based and acrylate-based rubber-modified vinyl graft copolymers. The zinc oxide may have an average particle diameter (D50) of about 0.5 μm to about 3 μm, for example, about 0.8 μm to about 3 μm, as measured using a particle size analyzer (Laser Diffraction Particle Size Analyzer LS 13 320, Beckman Coulter Co., Ltd.). In addition, the zinc oxide may have a BET specific surface area of about 1 m$^2$/g to about 10 m$^2$/g, for example, about 1 m$^2$/g to about 7 m$^2$/g, as measured by a BET analyzer (Surface Area and Porosity Analyzer ASAP 2020, Micromeritics Co., Ltd.), and a purity of about 99% or more. Outside these ranges, the thermoplastic resin composition can suffer from deterioration in weather resistance, antibacterial properties, and the like.

In some embodiments, the zinc oxide may have various shapes. For example, the zinc oxide may have a shape selected from among a spherical shape, a plate shape, a rod shape, and a combination thereof.

In some embodiments, the zinc oxide may have a peak intensity ratio (B/A) of about 0.01 to about 1.0, for example, about 0.1 to about 1.0, specifically about 0.1 to about 0.5, where A indicates a peak in the wavelength range of 370 nm to 390 nm and B indicates a peak in the wavelength range of 450 nm to 600 nm in photoluminescence measurement. Within this range, the thermoplastic resin composition can have good properties in terms of weather resistance, antibacterial properties, impact resistance, and the like.

In some embodiments, the zinc oxide may have a peak position degree (2θ) in the range of about 35° to about 37° and a crystallite size of about 1,000 Å to about 2,000 Å, for example, about 1,200 Å to about 1,800 Å, in X-ray diffraction (XRD) analysis, as calculated by Scherrer's equation (Equation 1) with reference to a measured FWHM value (full width at half maximum of a diffraction peak). Within these ranges, the thermoplastic resin composition can have good initial color, weather resistance, antibacterial properties, and the like.

$$\text{Crystallite size}(D) = \frac{K\lambda}{\beta \cos\theta} \quad \text{[Equation 1]}$$

where K is a shape factor, λ is an X-ray wavelength, β is an FWHM value (degree) of an X-ray diffraction peak, and θ is a peak position degree.

In some embodiments, the zinc oxide may be prepared by melting metallic zinc in a reactor, heating the molten zinc to about 850° C. to about 1,000° C., for example, about 900° C. to about 950° C., to vaporize the molten zinc, injecting oxygen gas into the reactor, cooling the reactor to about 20° C. to about 30° C., and heating the reactor to about 400° C. to about 900° C., for example, 500° C. to about 800° C., for about 30 minutes to about 150 minutes, for example, about 60 minutes to about 120 minutes.

In some embodiments, the zinc oxide (B) may be present in an amount of about 0.1 parts by weight to about 5 parts by weight, for example, about 0.3 parts by weight to about 3 parts by weight, specifically about 0.5 parts by weight to about 2 parts by weight, relative to about 100 parts by weight of the thermoplastic resin (A). If the content of the zinc oxide is less than about 0.1 parts by weight relative to about 100 parts by weight of the thermoplastic resin, the thermoplastic resin composition can suffer from deterioration in weather resistance, antibacterial properties, and the like, and if the content of the zinc oxide exceeds about 5 parts by weight, the thermoplastic resin composition can suffer from deterioration in impact strength, mechanical properties, and the like.

According to one embodiment of the invention, the thermoplastic resin composition may further include a UV stabilizer, such as a hindered amine light stabilizer (HALS), in order to improve weather resistance.

In some embodiments, the hindered amine-based UV stabilizer may include bis(2,2,6,6-tetramethyl-4-piperidyl)sebacate, bis(2,2,6,6-tetramethyl-2-piperidyl)sebacate, and a combination thereof.

In some embodiments, the hindered amine-based UV stabilizer may be present in an amount of about 0.05 parts by weight to about 2 parts by weight, for example, about 0.1 parts by weight to about 3 parts by weight, specifically about 0.3 parts by weight to about 2 parts by weight, relative to about 100 parts by weight of the thermoplastic resin. Within this range, the thermoplastic resin composition can exhibit good weather resistance, and the like.

The thermoplastic resin composition according to one embodiment of the invention may further include additives used in typical thermoplastic resin compositions. Examples of the additives may include flame retardants, fillers, antioxidants, anti-dripping agents, lubricants, release agents, nucleating agents, antistatic agents, pigments, dyes, and mixtures thereof, without being limited thereto. The additives may be present in an amount of about 0.001 parts by weight to about 40 parts by weight, for example, about 0.1 parts by weight to about 10 parts by weight, relative to about 100 parts by weight of the thermoplastic resin.

The thermoplastic resin composition according to one embodiment of the invention may be prepared in pellet form by mixing the aforementioned components, followed by melt extrusion in a typical twin-screw extruder at about 200° C. to about 280° C., for example, about 220° C. to about 250° C.

In some embodiments, the thermoplastic resin composition may have a color variation (ΔE) of about 1 to about 2, for example, about 1.2 to about 1.8, as calculated by Equation 2 based on initial color values ($L_0^*$, $a_0^*$, $b_0^*$) measured on an injection-molded specimen having a size of 50 mm×90 mm×3 mm using a spectrophotometer (CM-3700 Å, Konica Minolta Inc.) and color values ($L_1^*$, $a_1^*$, $b_1^*$) of the specimen measured in the same manner as above after exposure for 1,000 hours in accordance with ASTM G155.

$$\text{Color variation}(\Delta E) = \sqrt{(\Delta L^*)^2 + (\Delta a^*)^2 + (\Delta b^*)^2} \quad \text{[Equation 2]}$$

where ΔL* is a difference ($L_1^*-L_0^*$) between L* values before and after exposure, Δa* is a difference ($a_1^*-a_0^*$) between a* values before and after exposure, and Δb* is a difference ($b_1^*-b_0^*$) between b* values before and after exposure.

In some embodiments, the thermoplastic resin composition may have a notched Izod impact strength retention rate of about 70% or more, for example, about 70% to about 90%, as calculated according to Equation 3.

$$\text{Notched Izod impact strength retention rate (\%)} = (IZ_1/IZ_0) \times 100 \quad \text{[Equation 3]}$$

where $IZ_0$ denotes an initial notched Izod impact strength of a ⅛" thick specimen, as measured in accordance with ASTM D256, and $IZ_1$ denotes a notched Izod impact strength of the specimen, as measured in accordance with ASTM D256 after exposure for 1,000 hours in accordance with ASTM G155.

In some embodiments, the thermoplastic resin composition may have a tensile strength retention rate of about 60% or more, for example, about 70% to about 90%, as calculated by Equation 4.

$$\text{Tensile strength retention rate (\%)} = (TS_1/TS_0) \times 100 \quad \text{[Equation 4]}$$

where $TS_0$ denotes an initial tensile strength of a 3.2 mm thick specimen, as measured at a tensile rate of 5 mm/min in accordance with ASTM D638, and $TS_1$ denotes a tensile strength of the specimen, as measured at a tensile rate of 5 mm/min in accordance with ASTM D638 after exposure for 1,000 hours in accordance with ASTM G155.

In some embodiments, the thermoplastic resin composition may have a notched Izod impact strength retention rate of about 50% or more, for example, about 70% to about 80%, as calculated by Equation 5.

$$\text{Notched Izod impact strength retention rate (\%)} = (IZ_2/IZ_0) \times 100 \quad \text{[Equation 5]}$$

where $IZ_0$ denotes an initial notched Izod impact strength of a ⅛" thick specimen, as measured in accordance with ASTM D256, and $IZ_2$ denotes a notched Izod impact strength of the specimen, as measured in accordance with ASTM D256 after the specimen is dipped in deionized water at 70±1° C. for 7 days and in deionized water at 123±2° C. for 30 minutes.

In some embodiments, the thermoplastic resin composition may have a tensile strength retention rate of about 80% or more, for example, about 80% to about 95%, as calculated by Equation 6.

$$\text{Tensile strength retention rate (\%)} = (TS_2/TS_0) \times 100 \quad \text{[Equation 6]}$$

where $TS_0$ denotes an initial tensile strength of a 3.2 mm thick specimen, as measured at a tensile rate of 5 mm/min in accordance with ASTM D638, and $TS_2$ denotes a tensile strength of the specimen, as measured in accordance with ASTM D256 after the specimen is dipped in deionized water at 70±1° C. for 7 days and in deionized water at 123±2° C. for 30 minutes.

In some embodiments, the thermoplastic resin composition may have a notched Izod impact strength of about 10 kgf·cm/cm to about 30 kgf·cm/cm, for example, about 12 kgf·cm/cm to about 20 kgf·cm/cm, as measured on a ⅛" thick specimen in accordance with ASTM D256.

In some embodiments, the thermoplastic resin composition may have a tensile strength of about 500 kgf/cm² to about 600 kgf/cm², for example, about 500 kgf/cm² to about 570 kgf/cm², as measured on a 3.2 mm thick specimen at a tensile rate of 5 mm/min in accordance with ASTM D638.

A molded product according to the present invention is formed of the thermoplastic resin composition as set forth above. The thermoplastic resin composition may be prepared in pellet form. The prepared pellets may be produced into various molded products (articles) by various molding methods, such as injection molding, extrusion molding, vacuum molding, and casting. These molding methods are well known to those skilled in the art. The molded product exhibits good weather resistance to be used in an outdoor environment (satisfying the fl condition of UL 746C (passed UV exposure and water immersion test)) and good properties in terms of impact resistance, stiffness, flame retardancy, antibacterial properties, flowability (molding processability), and balance therebetween. Thus, the molded product can be advantageously used as interior/exterior materials for electric/electronic products.

MODE FOR INVENTION

Next, the present invention will be described in more detail with reference to some examples. It should be understood that these examples are provided for illustration only and are not to be in any way construed as limiting the present invention.

EXAMPLE

Details of components used in Examples and Comparative Examples are as follows:

(A) Thermoplastic Resin

A rubber-modified vinyl copolymer resin prepared by mixing (A1) a diene-based rubber-modified vinyl graft copolymer, (A2) an acrylate-based rubber-modified vinyl graft copolymer, and (A3) an aromatic vinyl copolymer resin in amounts as listed in Tables 2 and 3 was used.

(A1) Diene-Based Rubber-Modified Vinyl Graft Copolymer

A g-ABS copolymer obtained through graft-copolymerization of 45 wt % of styrene and acrylonitrile (weight ratio: 75/25) to 55 wt % of butadiene rubber having an average particle diameter of 200 nm was used.

(A2) Acrylate-Based Rubber-Modified Vinyl Graft Copolymer

A g-ASA copolymer obtained through graft-copolymerization of 50 wt % of styrene and acrylonitrile (weight ratio: 75/25) to 50 wt % of butyl acrylate rubber having an average particle diameter of 400 nm was used.

(A3) Aromatic Vinyl Copolymer Resin

A SAN resin (weight average molecular weight: 130,000 g/mol) obtained through polymerization of 71 wt % of styrene and 29 wt % of acrylonitrile was used.

(B) Zinc Oxide (B1) Metallic zinc was melted in a reactor, followed by heating to 900° C. to vaporize the molten zinc, and then oxygen gas was injected into the reactor, followed by cooling to room temperature (25° C.) to obtain a primary intermediate. Then, the primary intermediate was subjected to heat treatment at 700° C. for 90 minutes and cooled to room temperature (25° C.), thereby preparing zinc oxide.

(B2) Zinc oxide (Manufacturer: Ristecbiz Co., Ltd., Product name: RZ-950) was used.

(B3) Zinc oxide (Manufacture: Hanil Chemical Industry Co., Ltd., Product name: TE30) was used.

For each of the zinc oxides B1, B2, B3, average particle diameter, BET specific surface area, purity, peak intensity ratio (B/A) of peak B in the wavelength range of 450 nm to 600 nm to peak A in the wavelength range of 370 nm to 390 nm in photoluminescence measurement, and crystallite size were measured. Results are shown in Table 1.

TABLE 1

|  | (B1) | (B2) | (B3) |
| --- | --- | --- | --- |
| Average particle diameter (μm) | 1.2 | 1.1 | 3.7 |
| BET surface area (m²/g) | 4 | 15 | 14 |
| Purity (%) | 99 | 97 | 97 |
| PL peak intensity ratio (B/A) | 0.28 | 9.8 | 9.5 |
| Crystallite size (Å) | 1,417 | 503 | 489 |

Property Evaluation (1) Average particle diameter (unit: μm): Average particle diameter (volume average) was measured using a particle size analyzer (Laser Diffraction Particle Size Analyzer LS 13 320, Beckman Coulter Co., Ltd.).

(2) BET surface area (unit: m²/g): BET surface area was measured by a nitrogen gas adsorption method using a BET analyzer (Surface Area and Porosity Analyzer ASAP 2020, Micromeritics Co., Ltd.).

(3) Purity (unit: %): Purity was measured by thermogravimetric analysis (TGA) based on the weight of remaining material at 800° C.

(4) PL peak intensity ratio (B/A): Spectrum emitted upon irradiation of a specimen using a He—Cd laser (KIMMON, 30 mW) at a wavelength of 325 nm at room temperature was detected by a CCD detector in a photoluminescence measurement method, in which the CCD detector was maintained at −70° C. A peak intensity ratio (B/A) of peak B in the wavelength range of 450 nm to 600 nm to peak A in the wavelength range of 370 nm to 390 nm was measured. Here, an injection molded specimen was irradiated with laser beams without separate treatment upon PL analysis, and zinc oxide powder was compressed in a pelletizer having a diameter of 6 mm to prepare a flat specimen.

(5) Crystallite size (unit: Å): Crystallite size was measured using a high-resolution X-ray diffractometer (PRO-MRD, X'pert Inc.) at a peak position degree (2θ) in the range of 35° to 37° and calculated by Scherrer's equation (Equation 1) with reference to a measured FWHM value (full width at half maximum of a diffraction peak). Here, both a powder form and an injection molded specimen could be measured. For more accurate analysis, the injection molded specimen was subjected to heat treatment in air at 600° C. for 2 hours to remove a polymer resin therefrom before XRD analysis.

$$\text{Crystallite size}(D) = \frac{K\lambda}{\beta \cos\theta} \quad \text{[Equation 1]}$$

where K is a shape factor, λ is an X-ray wavelength, β is an FWHM value (degree) of an X-ray diffraction peak, and θ is a peak position degree.

Examples 1 to 5 and Comparative Examples 1 to 6

The aforementioned components were mixed in amounts as listed in Tables 2 and 3, followed by extrusion at 230° C., thereby preparing a thermoplastic resin composition in pellet form. Here, extrusion was performed using a twin-screw extruder (L/D: 36, Φ: 45 mm). The prepared pellets were dried at 80° C. for 2 hours or more and then subjected to injection molding using a 6 oz. injection machine (molding temperature: 230° C., mold temperature: 60° C.), thereby preparing a specimen. The prepared specimen was evaluated as to the following properties. Results are shown in Tables 2 and 3.

Property Evaluation (1) Weather resistance (color variation (ΔE)): For determination of color variation, initial color values $L_0^*$, $a_0^*$, $b_0^*$ were measured on an injection molded specimen having a size of 50 mm×90 mm×3 mm using a spectrophotometer (CM-3700 Å, Konica Minolta Inc.), followed by exposure for 1,000 hours in accordance with ASTM G155, and then color values $L_1^*$, $a_1^*$, $b_1^*$ of the specimen were measured in the same manner as above. Then, color variation (ΔE) was calculated by Equation 2.

$$\text{Color variation}(\Delta E) = \sqrt{(\Delta L^*)^2 + (\Delta a^*)^2 + (\Delta b^*)^2} \quad \text{[Equation 2]}$$

where ΔL* is a difference ($L_1^* - L_0^*$) between L* values before and after exposure, Δa* is a difference ($a_1^* - a_0^*$) between a* values before and after exposure, and Δb* is a difference ($b_1^* - b_0^*$) between b* values before and after exposure.

(2) Weather resistance and impact resistance (notched Izod impact strength retention rate (unit: %) after UV exposure): Notched Izod impact strength retention rate was calculated according to Equation 3.

$$\text{Notched Izod impact strength retention rate (\%)} = (IZ_1/IZ_0) \times 100, \quad \text{[Equation 3]}$$

where $IZ_0$ denotes an initial notched Izod impact strength of a ⅛" thick specimen, as measured in accordance with ASTM D256, and $IZ_1$ denotes a notched Izod impact strength of the specimen, as measured in accordance with ASTM D256 after exposure for 1,000 hours in accordance with ASTM G155.

(3) Weather resistance and stiffness (Tensile strength retention rate (unit: %) after exposure): Tensile strength retention rate was calculated according to Equation 4.

$$\text{Tensile strength retention rate (\%)} = (TS_1/TS_0) \times 100, \quad \text{[Equation 4]}$$

where $TS_0$ denotes an initial tensile strength of a 3.2 mm thick specimen, as measured at a tensile rate of 5 mm/min in accordance with ASTM D638, and $TS_1$ denotes a tensile strength of the specimen, as measured at a tensile rate of 5 mm/min in accordance with ASTM D638 after exposure for 1,000 hours in accordance with ASTM G155.

(4) Weather resistance and impact resistance (Notched Izod impact strength retention rate (unit: %) after dipping in water): Notched Izod impact strength retention rate was calculated according to according to Equation 5.

$$\text{Notched Izod impact strength retention rate (\%)} = (IZ_2/IZ_0) \times 100, \quad \text{[Equation 5]}$$

where $IZ_0$ denotes an initial notched Izod impact strength of a ⅛" thick specimen, as measured in accordance with ASTM D256, and $IZ_2$ denotes a notched Izod impact strength of the specimen, as measured in accordance with ASTM D256 after the specimen is dipped in deionized water at 70±1° C. for 7 days and in deionized water at 123±2° C. for 30 minutes.

(3) Weather resistance and stiffness (Tensile strength retention rate (unit: %) after dipping in water): Tensile strength retention rate was calculated according to according to Equation 6.

$$\text{Tensile strength retention rate (\%)} = (TS_2/TS_0) \times 100 \quad \text{[Equation 6]}$$

where $TS_0$ denotes an initial tensile strength of a 3.2 mm thick specimen, as measured at a tensile rate of 5 mm/min in accordance with ASTM D638, and $TS_2$ denotes a tensile strength of the specimen, as measured in accordance with ASTM D256 after the specimen is dipped in deionized water at 70±1° C. for 7 days and in deionized water at 123±2° C. for 30 minutes.

(4) Flame retardancy: Flame retardancy was measured on a 1.5 mm thick specimen in accordance with the UL-94 vertical test method.

(5) Flame retardancy (Flame retardancy after dipping in water): Flame retardancy was measured on a 1.5 mm thick specimen in accordance with the UL-94 vertical test method after the specimen was dipped in deionized water at 70±1° C. for 7 days and in deionized water at 123±2° C. for 30 minutes.

TABLE 2

| | | Example | | | | |
|---|---|---|---|---|---|---|
| | | 1 | 2 | 3 | 4 | 5 |
| (A) (parts by weight) | | 100 | 100 | 100 | 100 | 100 |
| (A) (wt %) | (A1) | 20 | 22 | 25 | 22 | 22 |
| | (A2) | 5 | 5 | 5 | 3 | 7 |
| | (A3) | 75 | 73 | 70 | 75 | 71 |
| (B) (parts by weight) | (B1) | 0.7 | 1 | 1 | 1 | 1 |
| | (B2) | — | — | — | — | — |
| | (B3) | — | — | — | — | — |
| Color variation (Δ E) | | 1.5 | 1.7 | 1.8 | 1.7 | 1.2 |
| $IZ_0$ (kgf · cm/cm) | | 14 | 16 | 20 | 14 | 19 |
| $IZ_1$ (kgf · cm/cm) | | 11 | 14 | 16 | 12 | 16 |
| $IZ_2$ (kgf · cm/cm) | | 10 | 12 | 13 | 10 | 13 |
| Notched Izod impact strength retention rate (%) after UV exposure | | 78.6 | 87.5 | 80.0 | 85.7 | 84.2 |
| Notched Izod impact strength retention rate (%) after dipping in water | | 71.4 | 75.0 | 65.0 | 71.4 | 68.4 |
| $TS_0$ (kgf/cm²) | | 560 | 530 | 560 | 500 | 570 |
| $TS_1$ (kgf/cm²) | | 400 | 410 | 420 | 400 | 430 |
| $TS_2$ (kgf/cm²) | | 500 | 490 | 510 | 450 | 490 |

TABLE 2-continued

|  | Example | | | | |
|---|---|---|---|---|---|
|  | 1 | 2 | 3 | 4 | 5 |
| Tensile strength retention rate (%) after UV exposure | 71.4 | 77.4 | 75.0 | 80.0 | 75.4 |
| Tensile strength retention rate (%) after dipping in water | 89.3 | 92.5 | 91.0 | 90.0 | 85.9 |
| UL94 flame retardancy | HB | HB | HB | HB | HB |
| Flame retardancy after dipping in water | HB | HB | HB | HB | HB |

*parts by weight: parts by weight relative to 100 parts by weight of thermoplastic resin (A)

TABLE 3

|  |  | Comparative Example | | | | | |
|---|---|---|---|---|---|---|---|
|  |  | 1 | 2 | 3 | 4 | 5 | 6 |
| (A) (parts by weight) |  | 100 | 100 | 100 | 100 | 100 | 100 |
| (A) (wt %) | (A1) | 22 | 22 | 22 | 22 | 22 | 22 |
|  | (A2) | 0.5 | 15 | 5 | 5 | 5 | 5 |
|  | (A3) | 77.5 | 63 | 73 | 73 | 73 | 73 |
| (B) (parts by weight) | (B1) | 1 | 1 | — | — | — | 10 |
|  | (B2) | — | — | 1 | — | — | — |
|  | (B3) | — | — | — | 1 | — | — |
| Color variation (Δ E) |  | 4.5 | 1.5 | 3.0 | 3.5 | 4.0 | 2.8 |
| IZ$_0$ (kgf · cm/cm) |  | 16 | 10 | 16 | 16 | 16 | 10 |
| IZ$_1$ (kgf · cm/cm) |  | 8 | 6 | 8 | 9 | 7 | 4 |
| IZ$_2$ (kgf · cm/cm) |  | 10 | 8 | 14 | 14 | 12 | 7 |
| Notched Izod impact strength retention rate (%) after UV exposure |  | 50.0 | 60.0 | 50.0 | 56.2 | 43.7 | 40.0 |
| Notched Izod impact strength retention rate (%) after dipping in water |  | 62.5 | 80.0 | 87.5 | 87.5 | 75.0 | 70.0 |
| TS$_0$ (kgf/cm$^2$) |  | 570 | 500 | 530 | 520 | 540 | 400 |
| TS$_1$ (kgf/cm$^2$) |  | 250 | 210 | 190 | 200 | 210 | 190 |
| TS$_2$ (kgf/cm$^2$) |  | 500 | 430 | 400 | 420 | 470 | 300 |
| Tensile strength retention rate (%) after UV exposure |  | 43.8 | 42.0 | 35.8 | 38.4 | 38.8 | 47.5 |
| Tensile strength retention rate (%) after dipping in water |  | 87.7 | 86.6 | 75.4 | 80.7 | 87.0 | 75.0 |
| UL94 flame retardancy |  | HB | HB | HB | HB | HB | HB |
| Flame retardancy after dipping in water |  | Fail | Fail | Fail | Fail | Fail | Fail |

*parts by weight: parts by weight relative to 100 parts by weight of thermoplastic resin (A)

From the results, it could be seen that the thermoplastic resin composition according to the present invention had good properties in terms of weather resistance, impact resistance, stiffness, flame retardancy, and the like.

Conversely, it could be seen that the composition of Comparative Example 1 including a small amount of the acrylate-based rubber-modified vinyl graft copolymer suffered from deterioration in weather resistance (discoloration resistance, flame retardancy after dipping in water, and the like), and the composition of Comparative Example 2 including an excess of the acrylate-based rubber-modified vinyl graft copolymer suffered from deterioration in weather resistance (mechanical properties after UV exposure, flame retardancy after dipping in water, and the like). Further, it could be seen that the compositions of Comparative Examples 3 to 5 prepared using zinc oxides (B2) and (B3) instead of zinc oxide (B1) or prepared without using zinc oxide suffered from deterioration in weather resistance (discoloration resistance, flame retardancy after dipping in water, and the like), and the composition of Comparative Example 6 prepared using an excess of zinc oxide suffered from deterioration in weather resistance (mechanical properties after UV exposure, flame retardancy after dipping in water, and the like) and the like.

It should be understood that various modifications, changes, alterations, and equivalent embodiments can be made by those skilled in the art without departing from the spirit and scope of the invention.

The invention claimed is:

1. A thermoplastic resin composition comprising:
   100 parts by weight of a thermoplastic resin comprising 15 wt % to 35 wt % of a diene-based rubber-modified vinyl graft copolymer, 1 wt % to 10 wt % of an acrylate-based rubber-modified vinyl graft copolymer, and 64 wt % to 84 wt % of an aromatic vinyl copolymer resin; and
   0.7 parts by weight to 1 part by weight of zinc oxide having an average particle diameter of 0.5 μm to 3 μm and a BET specific surface area of 1 m$^2$/g to 10 m$^2$/g,
   wherein the zinc oxide has a peak position degree (2θ) in the range of 35° to 370 and a crystallite size of 1,000 Å to 2,000 Å in X-ray diffraction (XRD) analysis, as calculated by Equation 1:

$$\text{Crystallite size}(D) = \frac{K\lambda}{\beta \cos\theta} \quad \text{[Equation 1]}$$

where K is a shape factor, λ is an X-ray wavelength, β is an FWHM value (degree) of an X-ray diffraction peak, and θ is a peak position degree, wherein the thermoplastic resin composition has:
   a color variation (ΔE) of 0.5 to 1.7, as calculated by Equation 2 based on initial color values (L$_0$*, a$_0$*, b$_0$*) measured on an injection-molded specimen having a size of 50 mm×90 mm×3 mm and color values (L$_1$*, a$_1$*, b$_1$*) of the specimen measured after exposure for 1,000 hours in accordance with ASTM G155:

$$\text{Color variation}(\Delta E) = \sqrt{(\Delta L^*)^2 + (\Delta a^*)^2 + (\Delta b^*)^2} \quad \text{[Equation 2]}$$

where ΔL* is a difference (L$_1$*-L$_0$*) between L* values before and after exposure, Δa* is a difference (a$_1$*-a$_0$*) between a* values before and after exposure, and Δb* is a difference (b$_1$*-b$_0$*) between b* values before and after exposure, a notched Izod impact strength retention rate of 70% or more, as calculated according to Equation 3:

Notched Izod impact strength retention rate (%)= (IZ$_1$/IZ$_0$)×100    [Equation 3]

where IZ$_0$ denotes an initial notched Izod impact strength of a ⅛" thick specimen, as measured in accordance with ASTM D256, and IZ$_1$ denotes a notched Izod impact strength of the specimen, as measured in accordance with ASTM D256 after exposure for 1,000 hours in accordance with ASTM G155, and a tensile strength retention rate of 60% or more, as calculated according to Equation 4:

Tensile strength retention rate (%)=(TS$_1$/TS$_0$)×100    [Equation 4]

where TS$_0$ denotes an initial tensile strength of a 3.2 mm thick specimen, as measured at a tensile rate of 5 mm/min in accordance with ASTM D638, and TS$_1$ denotes a tensile strength of the specimen, as measured at a tensile rate of 5 mm/min in accordance with ASTM D638 after exposure for 1,000 hours in accordance with ASTM G155.

2. The thermoplastic resin composition according to claim 1, wherein the diene-based rubber-modified vinyl graft copolymer and the acrylate-based rubber-modified vinyl graft copolymer are present in a weight ratio of 3:1 to 10:1.

3. The thermoplastic resin composition according to claim 1, wherein the diene-based rubber-modified vinyl graft copolymer is obtained through graft polymerization of a monomer mixture comprising an aromatic vinyl monomer and a vinyl cyanide monomer to a diene-based rubber polymer.

4. The thermoplastic resin composition according to claim 1, wherein the acrylate-based rubber-modified vinyl graft copolymer is obtained through graft polymerization of a monomer mixture comprising an aromatic vinyl monomer and a vinyl cyanide monomer to an acrylate-based rubber polymer having an average particle diameter of 200 nm to 500 nm.

5. The thermoplastic resin composition according to claim 1, wherein the zinc oxide has a peak intensity ratio (B/A) of 0.01 to 1.0, where A indicates a peak in the wavelength range of 370 nm to 390 nm and B indicates a peak in the wavelength range of 450 nm to 600 nm in photoluminescence measurement.

6. The thermoplastic resin composition according to claim 1, wherein the thermoplastic resin composition has a notched Izod impact strength retention rate of 50% or more, as calculated according to Equation 5:

Notched Izod impact strength retention rate (%)= $(IZ_2/IZ_0) \times 100$     [Equation 5]

where $IZ_0$ denotes an initial notched Izod impact strength of a ⅛" thick specimen, as measured in accordance with ASTM D256, and $IZ_2$ denotes a notched Izod impact strength of the specimen, as measured in accordance with ASTM D256 after the specimen is dipped in deionized water at 70±1° C. for 7 days and in deionized water at 123±2° C. for 30 minutes.

7. The thermoplastic resin composition according to claim 1, wherein the thermoplastic resin composition has a tensile strength retention rate of 80% or more, as calculated according to Equation:

Tensile strength retention rate (%)=$(TS_2/TS_0) \times 100$     [Equation 6]

where $TS_0$ denotes an initial tensile strength of a 3.2 mm thick specimen, as measured at a tensile rate of 5 mm/min in accordance with ASTM D638, and $TS_2$ denotes a tensile strength of the specimen, as measured in accordance with ASTM D256 after the specimen is dipped in deionized water at 70±1° C. for 7 days and in deionized water at 123±2° C. for 30 minutes.

8. The thermoplastic resin composition according to claim 1, wherein the thermoplastic resin composition has a notched Izod impact strength of 10 kgf·cm/cm to 30 kgf·cm/cm, as measured on a ⅛" thick specimen in accordance with ASTM D256.

9. The thermoplastic resin composition according to claim 1, wherein the thermoplastic resin composition has a tensile strength of 500 kgf/cm² to 600 kgf/cm², as measured on a 3.2 mm thick specimen at a tensile rate of 5 mm/min in accordance with ASTM D638.

10. A molded product formed of the thermoplastic resin composition according to claim 1.

\* \* \* \* \*